United States Patent
Onuma et al.

(10) Patent No.: US 10,523,335 B2
(45) Date of Patent: Dec. 31, 2019

(54) KNOWN SIGNAL DETECTION METHOD

(71) Applicants: NTT ELECTRONICS CORPORATION, Yokohama-shi, Kanagawa (JP); NIPPON TELEGRAPH AND TELEPHONE CORPORATION, Tokyo (JP)

(72) Inventors: Yasuharu Onuma, Kanagawa (JP); Etsushi Yamazaki, Kanagawa (JP); Tomohiro Takamuku, Kanagawa (JP); Masahiro Tachibana, Kanagawa (JP); Mitsuteru Yoshida, Kanagawa (JP); Masahito Tomizawa, Kanagawa (JP); Seiji Okamoto, Kanagawa (JP)

(73) Assignees: NTT ELECTRONICS CORPORATION, Yokohama-shi, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/092,391

(22) PCT Filed: Jun. 21, 2017

(86) PCT No.: PCT/JP2017/022862
§ 371 (c)(1),
(2) Date: Oct. 9, 2018

(87) PCT Pub. No.: WO2018/042837
PCT Pub. Date: Mar. 8, 2018

(65) Prior Publication Data
US 2019/0165868 A1    May 30, 2019

(30) Foreign Application Priority Data
Aug. 29, 2016 (JP) ................. 2016-166692

(51) Int. Cl.
*H04B 10/61* (2013.01)
*H04L 7/04* (2006.01)
(Continued)

(52) U.S. Cl.
CPC ......... *H04B 10/6164* (2013.01); *H04B 10/61* (2013.01); *H04B 10/615* (2013.01);
(Continued)

(58) Field of Classification Search
CPC .............. H04B 10/6164; H04B 10/615; H04B 10/6165; H04B 10/04; H04B 10/079;
(Continued)

(56) References Cited

U.S. PATENT DOCUMENTS 5,388,088 A * 2/1995 Gans .................... H04B 10/697
398/152
5,999,561 A * 12/1999 Naden .................... H04B 1/707
375/142
(Continued)

FOREIGN PATENT DOCUMENTS

JP    2002-374223      * 12/2002    .......... H04B 10/532
JP    2002-374223 A    12/2002
(Continued)

OTHER PUBLICATIONS

English translation of the Written Opinion of the International Searching Authority issued for corresponding International Patent Application No. PCT/JP2017/022862 dated Jan. 9, 2019. (English Language Translation Attached).
(Continued)

*Primary Examiner* — Abbas H Alagheband
(74) *Attorney, Agent, or Firm* — Myers Wolin, LLC.

(57) ABSTRACT

Fourier transform is performed on a reception signal to obtain a first calculation value. Fourier transform is performed on a known signal to obtain a second calculation
(Continued)

value. The first calculation value is divided by the second calculation value to obtain a third calculation value. Inverse Fourier transform is performed on the third calculation value to obtain a fourth calculation value. A maximum value of an amplitude of the fourth calculation value and a sample point at which the maximum value is obtained are detected. The position of the known signal in the reception signal is detected from the sample point at which the maximum value is obtained.

7 Claims, 10 Drawing Sheets

(51) Int. Cl.
    *H04L 7/08* (2006.01)
    *H04L 7/00* (2006.01)
(52) U.S. Cl.
    CPC ....... *H04B 10/6165* (2013.01); *H04L 7/0075* (2013.01); *H04L 7/04* (2013.01); *H04L 7/08* (2013.01)
(58) Field of Classification Search
    CPC ...... H04B 10/61; H04B 10/69; H04B 10/556; H04L 7/0075; H04L 7/08; H04L 27/28; H04L 27/2605; G06K 9/00; H04N 21/23892; H04N 21/44008; H04N 19/467; H04N 21/8358; H04N 21/4627; H04S 5/00
    USPC ......... 398/208, 202, 203; 375/220, 260, 343
    See application file for complete search history.

(56) References Cited

U.S. PATENT DOCUMENTS

| | | | | |
|---|---|---|---|---|
| 7,039,120 | B1* | 5/2006 | Thoumy | H04L 5/0007 375/260 |
| 7,480,235 | B2* | 1/2009 | Fujii | H04L 1/0007 370/208 |
| 7,558,327 | B2 | 7/2009 | Nowara | |
| 7,633,924 | B2* | 12/2009 | Fujii | H04L 27/2602 370/328 |
| 8,254,477 | B2* | 8/2012 | Sahara | H04L 27/2605 375/220 |
| 8,265,183 | B2* | 9/2012 | Kimura | H04L 27/2647 375/260 |
| 8,363,759 | B2* | 1/2013 | Araki | H04L 25/022 375/346 |
| 8,379,776 | B2* | 2/2013 | Sahara | H04L 27/2605 370/479 |
| 8,774,644 | B2* | 7/2014 | Sun | H04B 10/6161 398/202 |
| 8,929,750 | B2* | 1/2015 | Ishihara | H04B 10/07951 398/202 |
| 9,197,474 | B2* | 11/2015 | Sugiura | H04L 27/2678 |
| 9,520,947 | B2* | 12/2016 | Ishihara | H04B 10/07951 |
| 9,614,621 | B2* | 4/2017 | Ishihara | H04B 10/07951 |
| 2006/0233225 | A1* | 10/2006 | Omoto | H04L 7/042 375/149 |
| 2007/0201353 | A1* | 8/2007 | Wight | H03C 3/40 370/210 |
| 2009/0304126 | A1* | 12/2009 | Sahara | H04L 27/2605 375/343 |
| 2009/0316812 | A1* | 12/2009 | Sahara | H04L 27/2605 375/260 |
| 2010/0142664 | A1* | 6/2010 | Araki | H04L 25/022 375/348 |
| 2012/0070159 | A1* | 3/2012 | Ishihara | H04B 10/07951 398/202 |
| 2012/0219302 | A1* | 8/2012 | Sun | H04B 10/6161 398/208 |
| 2015/0287422 | A1* | 10/2015 | Short | G01S 7/288 704/205 |
| 2016/0006538 | A1* | 1/2016 | Yoshida | H04B 10/532 398/65 |

FOREIGN PATENT DOCUMENTS

| | | | | |
|---|---|---|---|---|
| JP | 2014-053864 A | * | 3/2014 | ......... H04B 10/697 |
| JP | 2014-053864 A | | 3/2014 | |
| JP | 2016-019030 | * | 2/2016 | ......... H04B 10/6161 |
| JP | 2016-019030 A | | 2/2016 | |

OTHER PUBLICATIONS

English translation of the International Preliminary Report on Patentability issued for corresponding International Patent Application No. PCT/JP2017/022862 dated Mar. 14, 2019. (English Language Translation Attached).

Japanese Office Action of related Japanese Patent Application No. 2016-166692 dated Sep. 12, 2017.

The extended European search report, supplementary European search report, and the European search opinion issued for corresponding European Patent Application No. 17845847.7, dated Oct. 8, 2019.

Bouzaine et al., "Frequency-Based Frame Synchronization for High-Speed Optical OFDM," Optical Networks Group, Department of Electronic and Electrical Engineering, 2012 International Conference on Photonics in Switching, University College London, London, UK, Sep. 11, 2012, pp. 1-3.

* cited by examiner

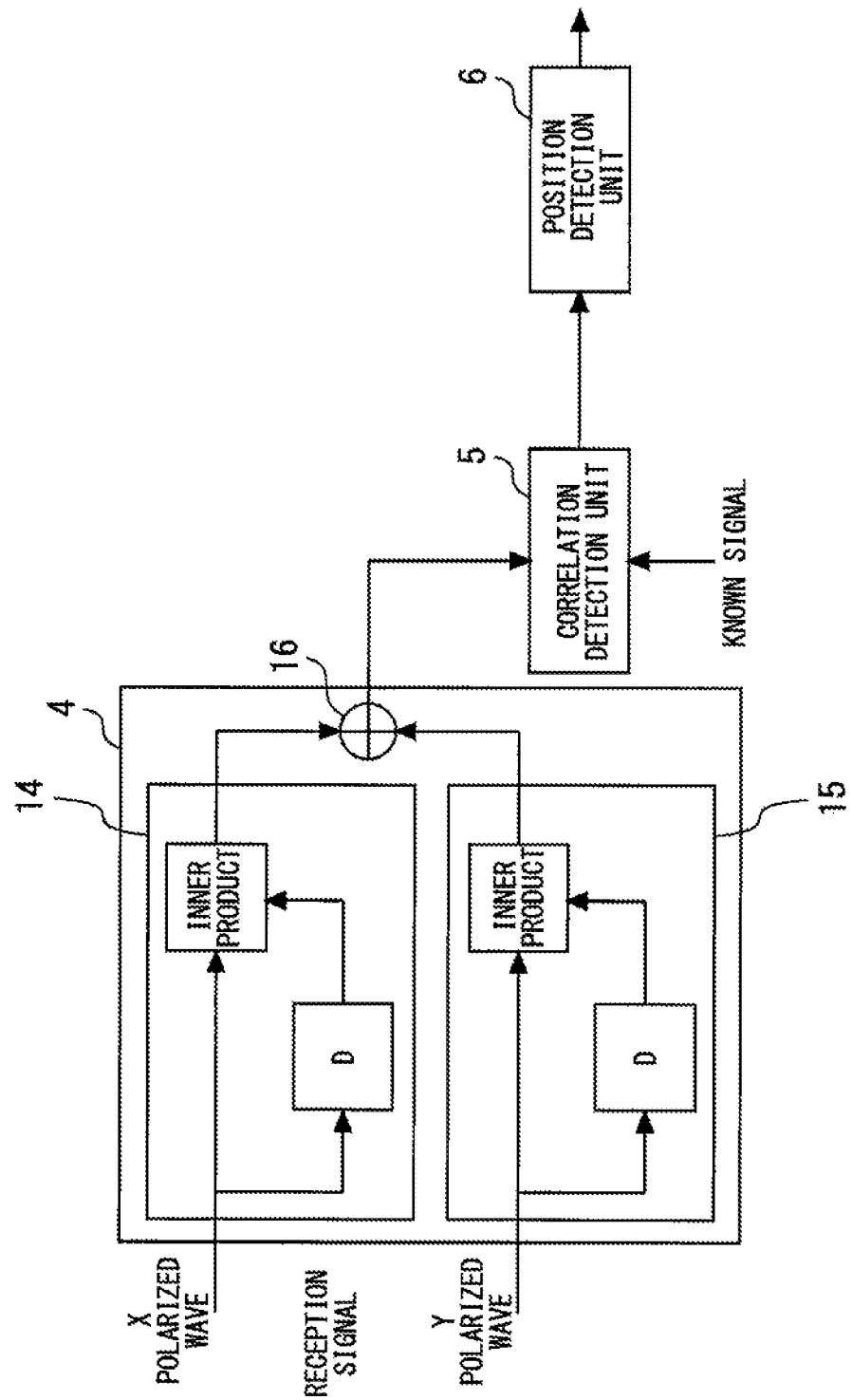

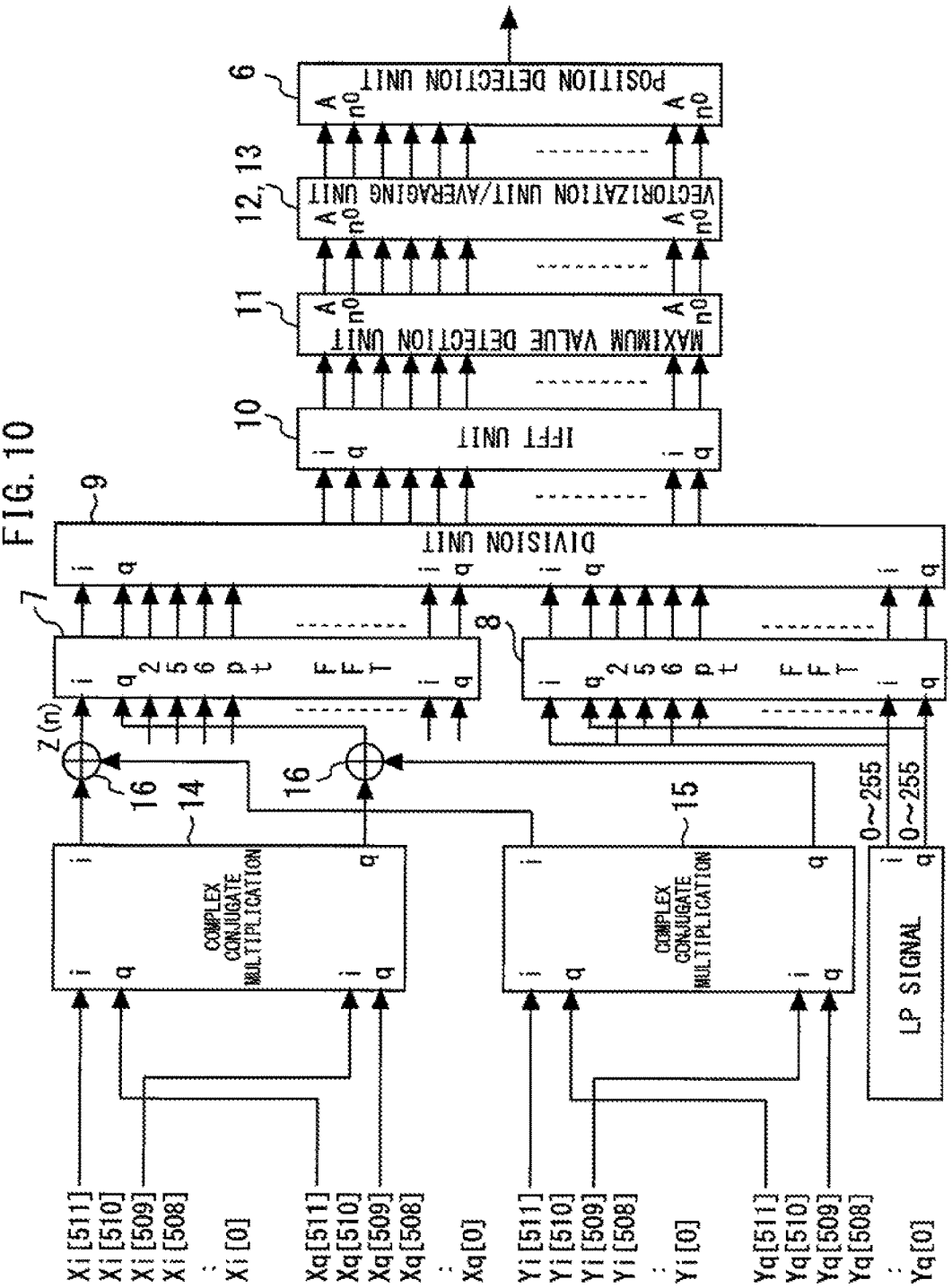

KNOWN SIGNAL DETECTION METHOD

CROSS-REFERENCE TO RELATED APPLICATIONS

This application is a National Stage entry of International Application No. PCT/JP2017/022862, filed Jun. 21, 2017, which claims priority to Japanese Patent Application No, 2016-166692, filed Aug. 29, 2016. The disclosures of the priority applications are incorporated in their entirety herein by reference.

FIELD

The present invention relates to a known signal detection method for detecting a known signal to be used for timing synchronization of a frame and compensation for transmission path characteristics in data communication.

BACKGROUND

In coherent optical communication, it is planned to realize larger capacity by compensation for transmission characteristics and accurate synchronization of timings on a reception side. In various kinds of compensation and timing synchronization, a known signal, for example, a frame synchronization signal (a long-period known pattern signal (LP signal)) inserted in advance for each frame of a reception signal is used. Performance of making capacity larger depends on whether this LP signal can be detected accurately at high speed. Further, in optical communication, transmission characteristics degrade due to polarization dispersion, or the like. Under such circumstances, it is important to accurately detect an LP signal.

In related art, in the case where a signal is received, the signal is correlated with a known signal on the time axis (see, for example, PTL 1). Typically, the signal is correlated for each sampling. As a correlation method, a method in which convolution operation between the signals is performed is common. If a signal pattern matches, the correlation becomes the highest. Note that, in the case where two polarized waves are utilized as in optical communication, the polarized waves are correlated independently from each other.

CITATION LIST

Patent Literature

[PTL 1] JP 2016-19030 A

SUMMARY

Technical Problem

However, with the known signal detection method in related art, there is a case where erroneous detection is performed in a state where polarization demultiplexing and compensation for transmission characteristics are not completely performed. Meanwhile, there is also a method which utilizes a special pattern with which a pattern can be recognized even if two polarized waves and a Real part and an Imaginary part in complex representation of the two polarized waves interfere with each other. However, there is a problem of flexibleness that while such a special pattern is appropriate for a synchronization function, the pattern is not appropriate for other functions.

The present invention has been made to solve the problem as described above, and an object of the present invention is to obtain a known signal detection method which is capable of reliably detecting a position of a known signal in a reception signal without using a special pattern as the known signal even in a state where polarization demultiplexing and compensation for transmission characteristics are not completely performed.

Solution to Problem

A known signal detection method according to the present invention performed by a known signal detection apparatus and detecting a position of a known signal in a reception signal includes: performing Fourier transform on the reception signal to obtain a first calculation value; performing Fourier transform on the known signal to obtain a second calculation value; multiplying the first calculation value by a complex conjugate of the second calculation value to obtain a third calculation value; performing inverse Fourier transform on the third calculation value to obtain a fourth calculation value; detecting a maximum value of an amplitude of the fourth calculation value and a sample point at which the maximum value is obtained; and detecting the position of the known signal in the reception signal from the sample point at which the maximum value is obtained.

Advantageous Effects of Invention

The present invention makes it possible to reliably detect a position of a known signal in a reception signal without using a special pattern as the known signal even in a state where polarization demultiplexing and compensation for transmission characteristics are not completely performed.

BRIEF DESCRIPTION OF THE DRAWINGS

FIG. 9 is a diagram illustrating a differential detection unit according to Embodiment 3 of the present invention.

FIG. 10 is a diagram illustrating a known signal detection apparatus according to Embodiment 3 of the present invention.

DESCRIPTION OF EMBODIMENTS

A known signal detection method according to the embodiments of the present invention will be described with reference to the drawings. The same components will be denoted by the same symbols, and the repeated description thereof may be omitted.

Embodiment 1

Figure 1:
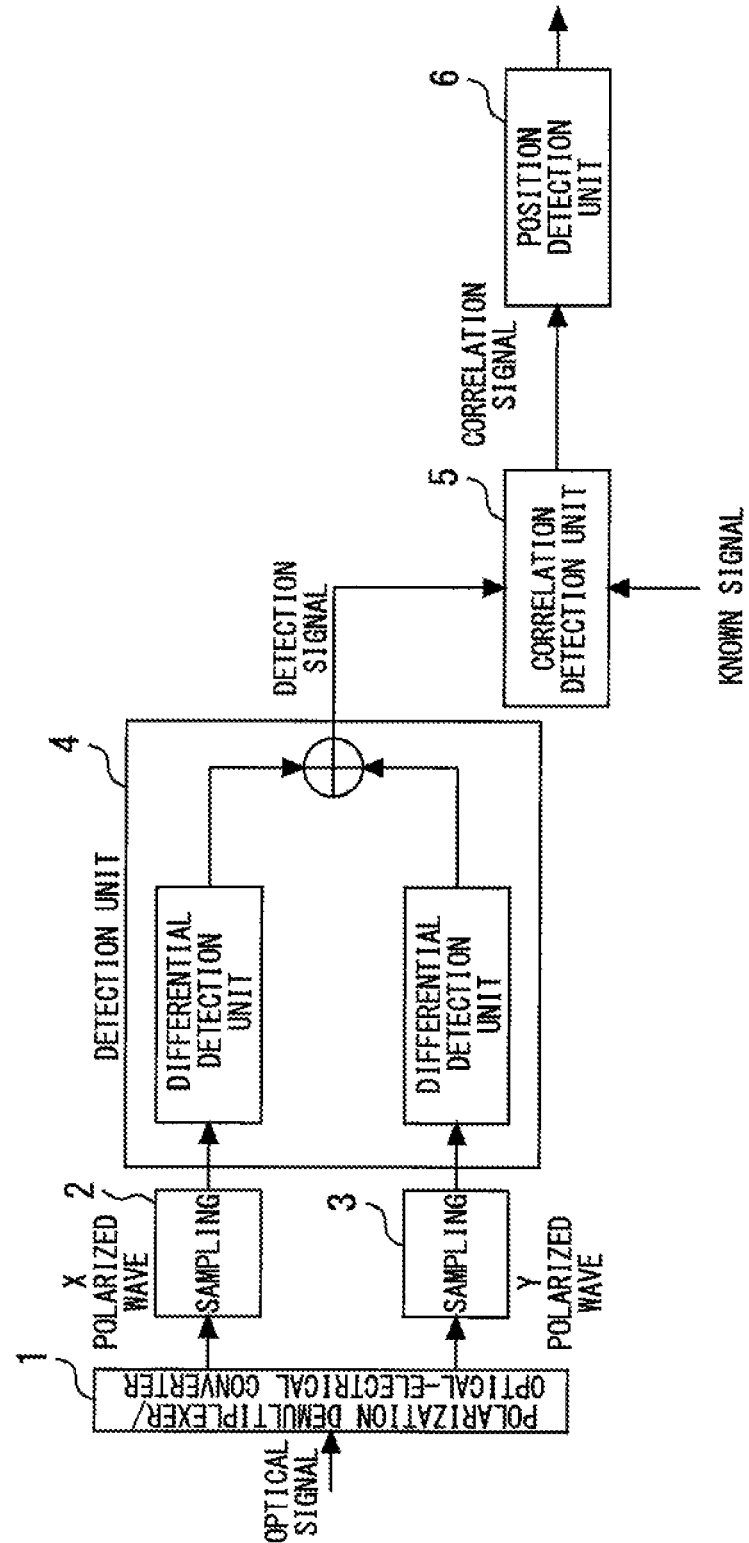
FIG. 1 is a diagram illustrating a known signal detection apparatus according to Embodiment 1 of the present invention.

FIG. 1 is a diagram illustrating a known signal detection apparatus according to Embodiment 1 of the present invention. The known signal detection apparatus is provided at a reception apparatus of a coherent optical communication apparatus and detects a position of a known signal in a reception signal.

A polarization demultiplexer/optical-electrical converter 1 performs polarization demultiplexing on a received optical signal and converts the signals into analog electrical signals. Sampling apparatuses 2 and 3 respectively sample the analog electrical signals of an X polarized wave and a Y polarized wave to convert the signals into digital signals.

A detection unit 4 performs differential detection respectively on the digital signals of an X polarized wave and a Y polarized wave and adds the signals to obtain a detection signal. A correlation detection unit 5 detects correlation between the detection signal and a known signal to calculate a correlation signal. A position detection unit 6 detects a position of the known signal in the reception signal (detection signal) on the basis of the correlation signal.

Figure 2:
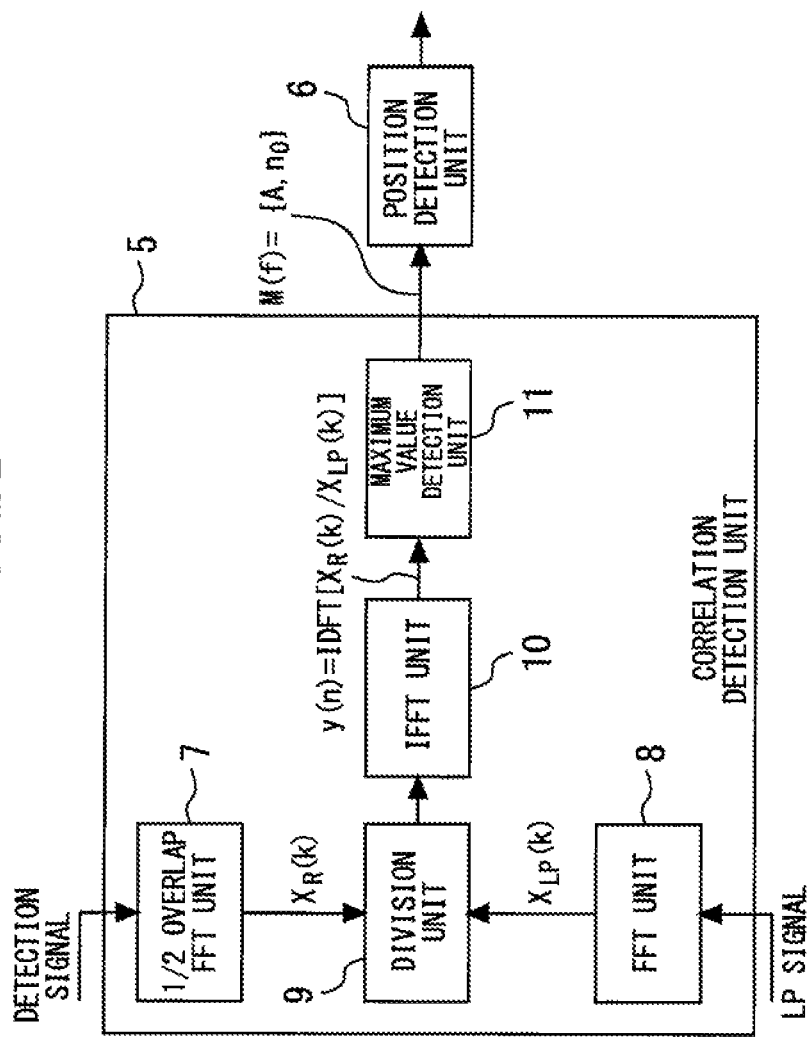
FIG. 2 is a diagram illustrating the correlation detection unit according to Embodiment 1 of the present invention.
Figure 3:
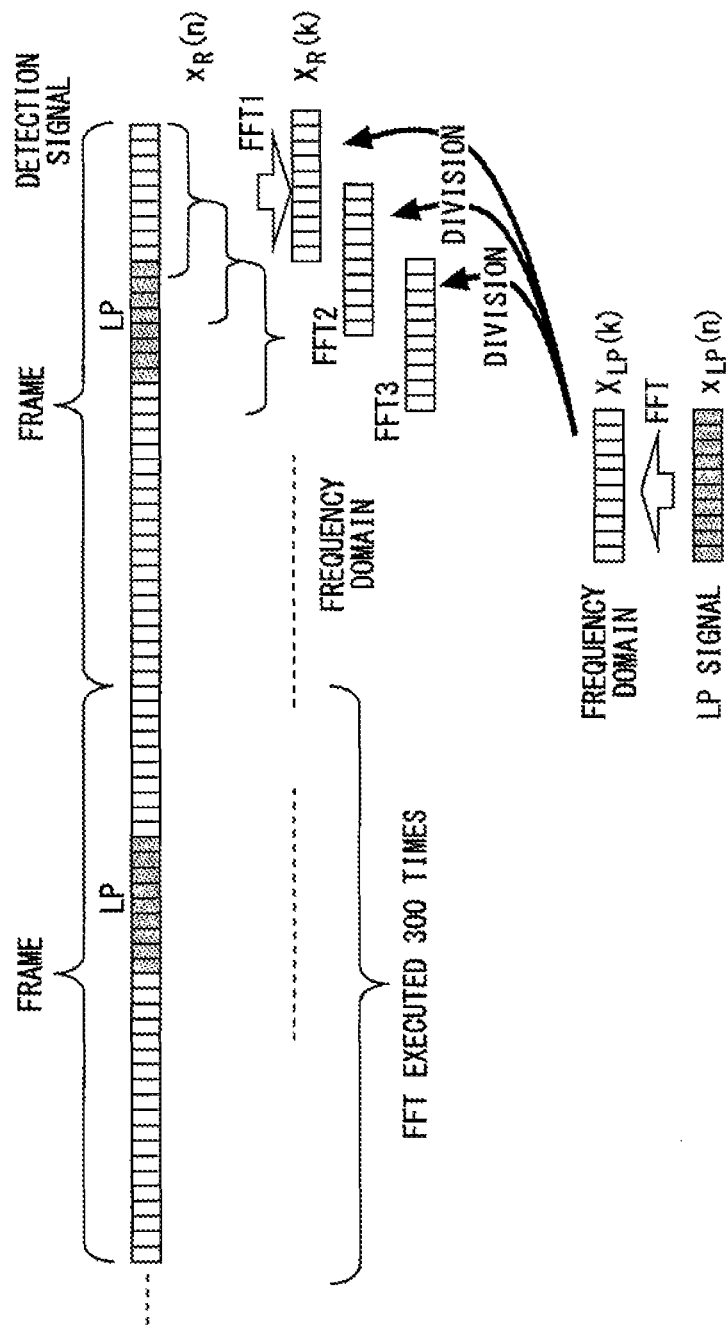
FIG. 3 is a diagram for explaining operation of the correlation detection unit according to Embodiment 1 of the present invention.
Figure 4:
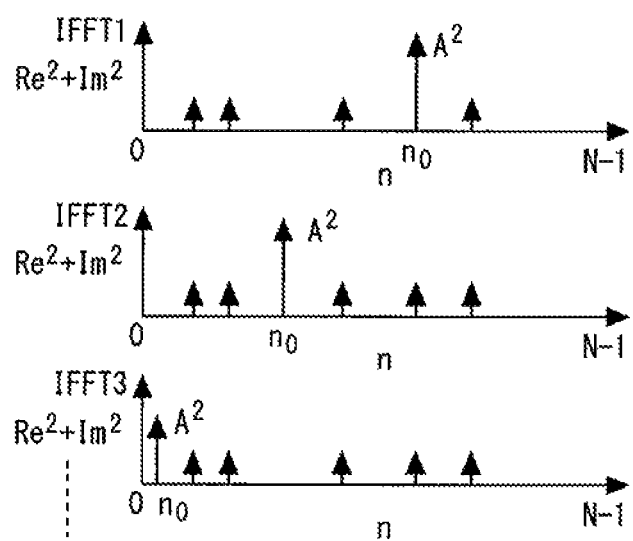
FIG. 4 is a diagram for explaining operation of the correlation detection unit according to Embodiment 1 of the present invention.
Figure 5:
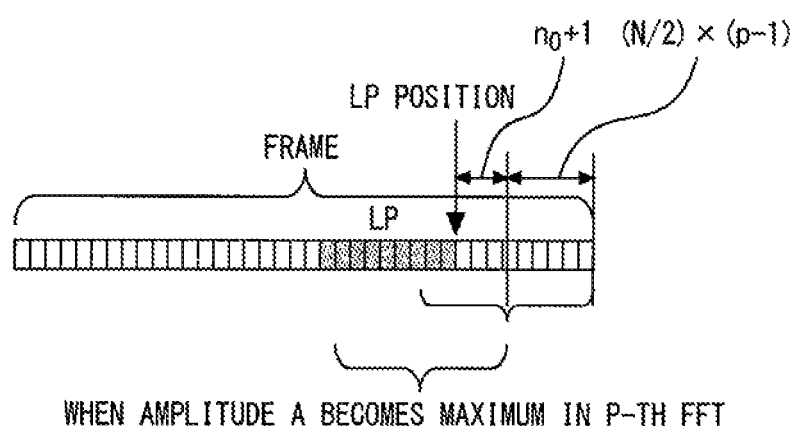
FIG. 5 is a diagram for explaining operation of the position detection unit according to Embodiment 1 of the present invention.

FIG. 2 is a diagram illustrating the correlation detection unit according to Embodiment 1 of the present invention. FIG. 3 and FIG. 4 are diagrams for explaining operation of the correlation detection unit according to Embodiment 1 of the present invention. As illustrated in FIG. 3, the detection signal output from the detection unit 4 is made up of a plurality of frames (several thousands to several tens of thousands of symbols/frame) in which a training sequence LP (for example, 256 symbols) which is the known signal is inserted at the same position in each frame.

A ½ overlap FFT unit 7 performs Fourier transform (FFT) on the detection signal for each of N times of sampling which indicates a size of FFT to obtain a first calculation value $X_R(k)$. For example, FFT (N=256) of 256 points is used. While the number of symbols which is the same as the number of symbols of the LP signal can be preferably adapted as the size of FFT, the size of FFT is not limited to this. In the first FFT, FFT is executed on the first symbol to the 256-th symbol, in the second FFT, FFT is executed on the 129-th symbol to the 384-th symbol, and in the third FFT, FFT is executed on the 257-th symbol to the 512-th symbol.

At this time, the ½ overlap FFT unit 7 performs Fourier transform on data of the detection signal while data is made to overlap by half of N (the size of FFT or the number of points). For example, in a case of (128+128×300) symbols per frame, FFT is performed 300 times. By performing FFT while dividing the detection signal and making part of the detection signal overlap in this manner, it is possible to prevent detection sensitivity from lowering even in the case where the LP signal spans a plurality of FFT windows. Note that an overlapped amount is not limited to N/2, and, for example, may be N/3 or 2N/3.

The first calculation value $X_R(k)$ can be calculated from the following equation. However, while FFT is used in a circuit configuration, because discrete Fourier transform (DFT) is logically used, in the following equation, DFT (and IDFT (inverse DFT)) is used. Note that $x_R(n)$ is complex representation (Re+j Im) of a signal at a sampling point (sample point)n.

$$X_R(k) = DFT[x_R(n)] = \sum_{n=0}^{N-1} x_R(n)e^{-j\frac{2\pi}{N}nk} \qquad [\text{Math. 1}]$$

Note that, by using a pattern in which the LP signal is multiplied by an LPF, it is possible to realize resistance to distortion in a transmission path such as chromatic dispersion and PMD (polarization mode dispersion).

An FFT unit 8 performs Fourier transform on the LP signal which is the known signal at the same size as that in the ½ overlap FFT unit 7 to obtain a second calculation value $X_{LP}(k)$. For example, assuming that the LP signal can be expressed with N=256 sampling, FFT of 256 points is executed on 256 symbols of the LP signal. The second calculation value $X_{LP}(k)$ can be calculated from the following equation.

$$X_{LP}(k) = DFT[x_{LP}(n)] = \sum_{n=0}^{N-1} x_{LP}(n)e^{-j\frac{2\pi}{N}nk} \qquad [\text{Math. 2}]$$

A division unit 9 divides the first calculation value $X_R(k)$ by the second calculation value $X_{LP}(k)$ to obtain a third calculation value $X_R(k)/X_{LP}(k)$. Note that, because this division is division in a complex number, if this division is performed in a form of multiplication as indicated below, it is possible to perform efficient calculation. Further, to avoid division by zero, it is also possible to employ a configuration where the first calculation value $X_R(k)$ is multiplied by a complex conjugate of the second calculation value $X_{LP}(k)$.

1/(Re+j Im)={1/(Re²+Im²)}(Re−j Im)

In this case, by multiplying the first calculation value $X_R(k)$ only by the complex conjugate (Re−j Im) of the second calculation value $X_{LP}(k)$ (a coefficient is arbitrarily set), it is possible to perform further efficient calculation.

The IFFT unit 10 obtains a fourth calculation value y(n) by performing inverse Fourier transform on the third calculation value $X_R(k)/X_{LP}(k)$. This inverse Fourier transform is also performed a plurality of times along the data of the detection signal.

y(n)=IDFT[$X_R(k)/X_{LP}(k)$]

As a result of IDFT, a Real part RE and an Imaginary part Im are respectively output for 256 sample points. Here, $Re^2+Im^2$ indicates a square of an amplitude of the fourth calculation value y(n).

A maximum value detection unit 11 detects a maximum value A of each amplitude in N=256 sample points and a sample point $n_0$ at which the maximum value is obtained. However, $n_0$ is between 0 and N−1.

Here, if the LP signal is included in the detection signal, as illustrated in FIG. 4, output y(n) of the IFFT unit 10 appears as an impulse at a position of n corresponding to shift between an LP signal of the received detection signal and an LP signal which is made a comparison target as the known signal.

The above-described maximum value detection is performed on output of a plurality of times of FFT and IFFT executed in an overlapped manner within one frame of the detection signal. Here, a set of a maximum value of 300 per frame and a sample point of the maximum value is detected.

The position detection unit 6 detects the position of the known signal in a frame of the reception signal from the sample point at which the maximum value is obtained. FIG.

5 is a diagram for explaining operation of the position detection unit according to Embodiment 1 of the present invention. Correlation matching in a frequency domain is detected as an impulse if the correlation matching is returned to a time domain. Therefore, in the case where there is an LP signal at each FFT window, an impulse occurs at output y(n) of the IFFT unit 10. Therefore, the LP signal exists in FFT in which a maximum value is obtained among a plurality of times of FFT in which a maximum value is detected in one frame. A position of the sample point at which the maximum value is obtained in the FFT becomes the position of the LP signal. In the case where an impulse can be detected at a sample point n0 of the p-th FFT, the position of the LP signal in the frame can be calculated from $(N/2) \times (p-1)+(n_0+1)$. However, this is an example in the case where FFT is performed while data is made to overlap by N/2, and a calculation equation for the position of the LP signal can be easily made also in a case of other types of overlap. For example, in the case where a maximum value is obtained at a sample point of $n_0=50$ in the third FFT, a position of $256/2 \times (3-1)+(50+1)=307$-th symbol from an end of the frame can be detected as the position of the LP signal.

As described above, in the present embodiment, by utilizing FFT and IFFT, compared to the method in which comparison is performed in units of a symbol in a time domain as in related art, it is possible to detect a position of a known signal in a reception signal with a simple configuration and reduce a scale of calculation. Further, it is possible to reliably detect a position of a known signal in a reception signal without using a special pattern as the known signal even in a state where polarization demultiplexing and compensation for transmission characteristics are not completely performed.

Embodiment 2

Figure 6:
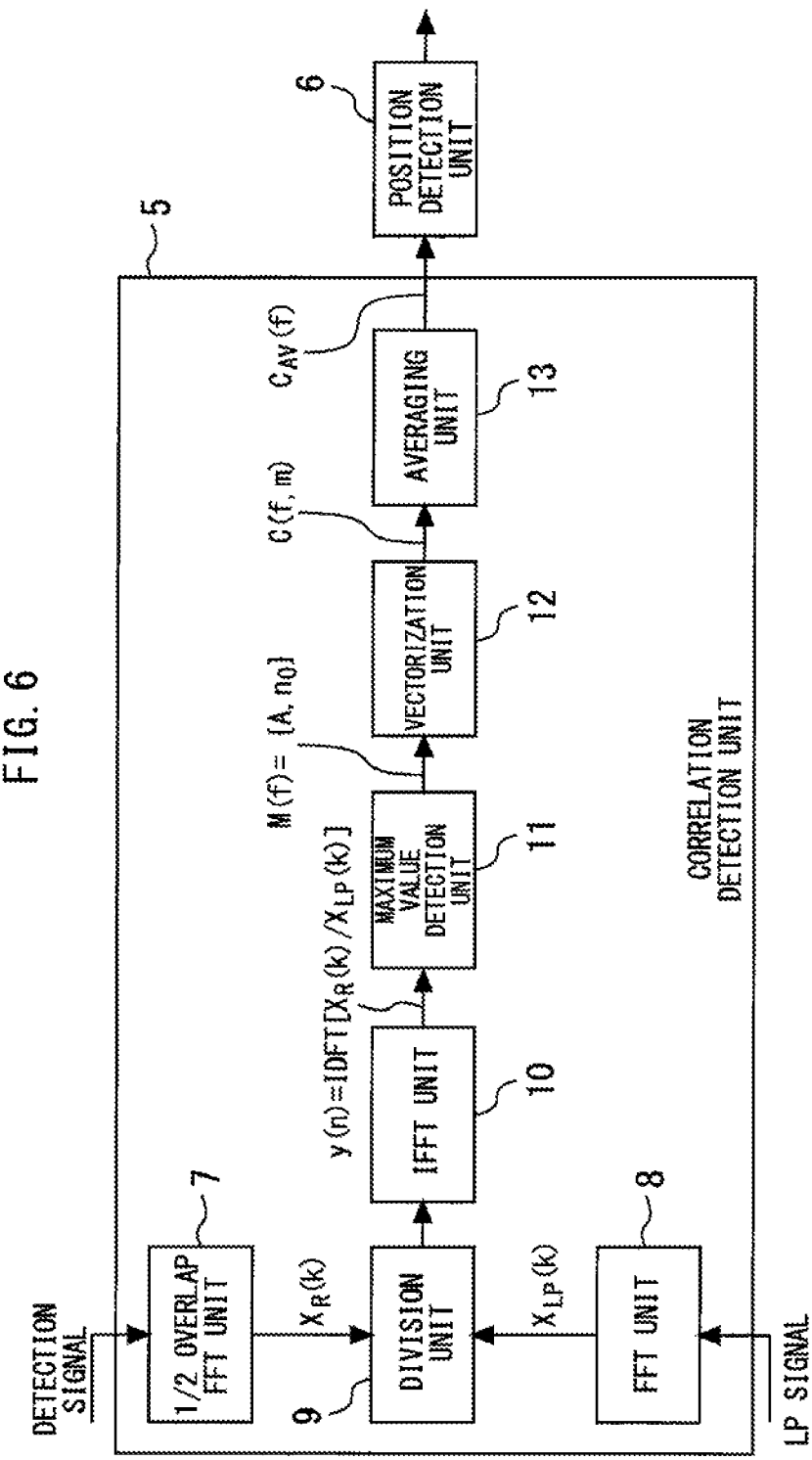
FIG. 6 is a diagram illustrating a correlation detection unit according to Embodiment 2 of the present invention.
Figure 7:
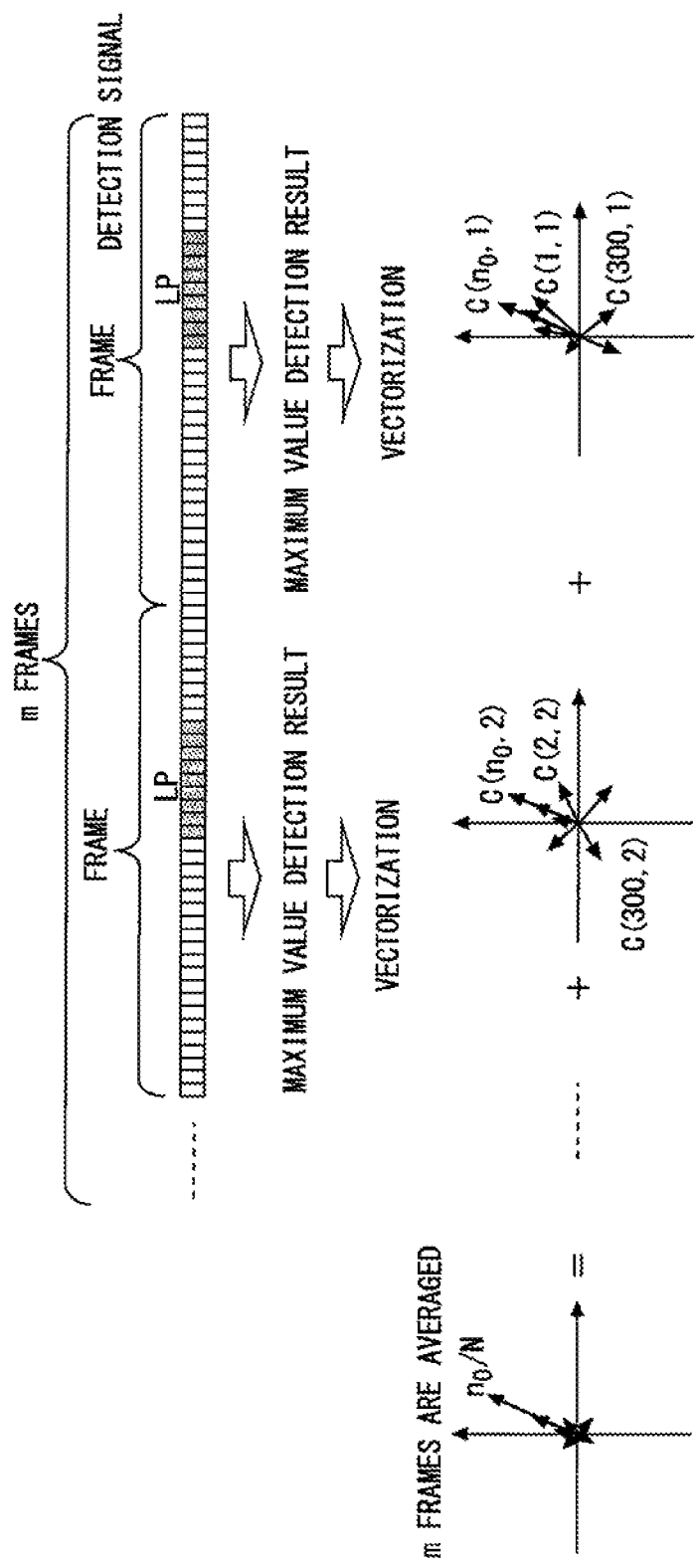
FIG. 7 is a diagram for explaining operation of the correlation detection unit according to Embodiment 2 of the present invention.

FIG. 6 is a diagram illustrating a correlation detection unit according to Embodiment 2 of the present invention. FIG. 7 is a diagram for explaining operation of the correlation detection unit according to Embodiment 2 of the present invention. In the present embodiment, a configuration until detection of a maximum value is the same as that in Embodiment 1, and a vectorization unit 12 and an averaging unit 13 are added after the configuration.

The maximum value detection unit 11 detects a maximum value A of an amplitude in each FFT of each frame and detects a sample point $n_0$ at which the maximum value is obtained. The vectorization unit 12 generates a vector C(f, m) in which the maximum value A is associated with the amplitude and the sample point $n_0$ is associated with the phase as indicated below.

$$C(f, m) = A\exp(j2\pi(n_0/N))$$
$$= A\cos 2\pi(n_0/N) + jA\sin 2\pi(n_0/N)$$

Here, f indicates the f-th FFT, and m indicates the m-th frame. N corresponds to a size of discrete Fourier transform. Particularly, by the sample point $n_0$ being converted into a phase index, two-dimensional averaging using vector synthesis is facilitated.

A vector of a maximum value detection result detected in each frame can be expressed on polar coordinates as illustrated in a lower part of FIG. 7. In the case where the detection signal is subjected to distortion and degrades by transmission path characteristics in optical communication, if the detection signal is correlated with a known LP signal, there is a case where the detection signal is affected by noise. While, in FIG. 7, a signal at which a maximum value is obtained can be observed in substantially the same direction in each frame, there is also a case where a large correlation value is output depending on noise. Influence of such noise can be suppressed by averaging which will be described below.

The averaging unit 13 averages vectors over a plurality of frames. An averaged vector $C_{AV}(f)$ can be calculated from the following equation.

$$C_{AV}(1) = \{C(1,1)+C(1,2)++C(1,m)\}/m$$

$$C_{AV}(2) = \{C(2,1)+C(2,2)++C(2,m)\}/m$$

.

.

.

$$C_{AV}(f) = \{C(f,1)+C(f,2)++C(f,m)\}/m$$

Specifically, there are the following two methods. The first method is a method in which a vector obtained from the maximum value detection result is subjected to cumulative addition over m frames for each FFT. Specifically, the averaged vector can be obtained by respectively performing cumulative addition on a Real part and an Imaginary part in polar coordinates.

The Real part Re and the Imaginary part Im can be respectively calculated from the following equations.

$$Re = A \cos 2\pi(n_0/N)$$

$$Im = A \sin 2\pi(n_0/N)$$

Because the calculation is cumulative addition, by adding data of the next frame (the Real part and the Imaginary part) to data of the first frame (the Real part and the Imaginary part), it is possible to minimize a memory. Note that calculation of division by "m" at the last part of the averaging equation can be deleted or added as necessary in accordance with a memory and a circuit configuration. Typically, averaging is substantially equivalent to cumulative addition on digital data processing.

The second method is a method in which IIR (Infinite Impulse Response) using a forgetting factor is utilized. With this method, it is possible to suppress a memory amount. While the IIR filter includes a feedback loop, it is possible to average data which are sequentially input with less filter coefficients. That is, in this IIR filter, influence of the past value is set at a filter coefficient as a forgetting factor. As the forgetting factor approaches zero, influence of the past value is smaller, while, as the forgetting value approaches 1, influence of the past value is greater.

In the case where the known signal is repeatedly inserted at the same position for each frame, vectors generated in a plurality of frames are averaged. By this means, random signals are reduced, only portion of the known signal which is constantly inserted remains, and peak becomes clearer, so that it is possible to detect the position of the LP signal with higher accuracy.

Figure 8:
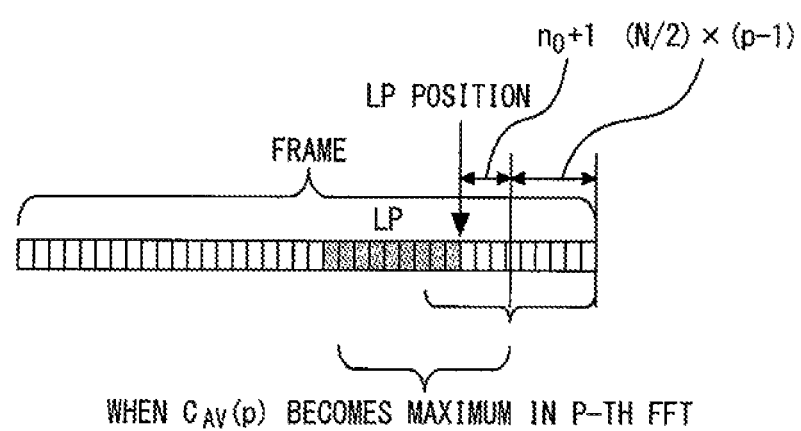
FIG. 8 is a diagram for explaining operation of the position detection unit according to Embodiment 2 of the present invention.

FIG. 8 is a diagram for explaining operation of the position detection unit according to Embodiment 2 of the present invention. Operation principles are the same as those in Embodiment 1. The position detection unit 6 detects the position of the LP signal from the sample point corresponding to a phase at which an amplitude of the averaged vector becomes a maximum. Specifically, first, a Fourier transform window at which an amplitude of the averaged vectors $C_{AV}(1)$ to $C_{AV}(300)$ becomes a maximum is detected. Here, it is assumed that a maximum value is obtained in the p-th FFT. Then, $n_0$ is extracted from the detected FFT. In a similar manner to Embodiment 1, the position of the LP signal in the frame is detected at $(N/2) \times (p-1) + (n_0+1)$ from a position of the Fourier transform window in the frame and the sample point corresponding to the phase at which the amplitude of the averaged vector becomes a maximum. However, this is an example in the case where FFT is performed while data is made to overlap by N/2, and a calculation equation for the position of the LP signal can be easily made also in a case of other types of overlap.

Embodiment 3

FIG. 9 is a diagram illustrating a differential detection unit according to Embodiment 3 of the present invention. The differential detection unit 14 obtains an inner product of an X polarized wave signal X(n) and a signal X(n−1) delayed by one symbol from the X polarized wave signal X(n). The differential detection unit 15 obtains an inner product of a Y polarized wave signal Y(n) and a signal Y(n−1) delayed by one symbol from the Y polarized wave signal Y(n). The method will be described below.

$$\text{Output of the differential detection unit } 14 = X(n) \times X(n-1)^*$$
$$= [Xi(n) + jXq(n)] \times [Xi(n-1) - jXq(n-1)]$$
$$= [Xi(n)Xi(n-1) + Xq(n)Xa(n-1)] +$$
$$j[-Xi(n)Xq(n-1) + Xi(n-1)Xq(n)]$$

$$\text{Output of the differential detection unit } 15 = Y(n) \times Y(n-1)^*$$
$$= [Yi(n) + jYq(n)] \times [Yi(n-1) - jYq(n-1)]$$
$$= [Yi(n)Yi(n-1) + Yq(n)Yq(n-1)] +$$
$$j[-Yi(n)Yq(n-1) + Yi(n-1)Yq(n)]$$

Because influence of phase fluctuation and frequency offset is relatively small between adjacent symbols, it is possible to largely reduce the influence of phase noise and frequency offset by differential detection delayed by one symbol. By the differential detection units 14 and 15 obtaining inner products of the respective polarized waves and an addition unit 16 adding two polarized wave components each other, even in a state where polarization demultiplexing is not completely performed and in a state where linear distortion exists, it is possible to cancel out the influence and extract signals.

FIG. 10 is a diagram illustrating a known signal detection apparatus according to Embodiment 3 of the present invention. Xi[0] to Xi[511] are data obtained by cutting out 512 samples from data obtained by sampling the Real part of the reception signal of the X polarized wave. Xq[0] to Xq[511] are data obtained by cutting out 512 samples from data obtained by sampling the Imaginary part of the reception signal of the X polarized wave. Yi[0] to Yi[511] are data obtained by cutting out 512 samples from data obtained by sampling the Real part of the reception signal of the Y polarized wave. Yq[0] to Yq[511] are data obtained by cutting out 512 samples from data obtained by sampling the Imaginary part of the reception signal of the X polarized wave. Note that, in the present example, because there are two samples per symbol, symbols are indicated every other sample. In a case of differential detection, a sample 511 and a sample 509 are used. While not illustrated in this drawing, an adjacent sample 511 is used for a sample 1.

For example, differential detection of the sample 511 can be expressed with the following equations.

Output of X polarized wave differential detection=
[Xi(511)+jXq(511)]×[Xi(509)−jXq(509)]

Output of Y polarized wave differential detection=[Yi(511)+jYq(511)]×[Yi(509)−jYq(509)]

Detection signal=output of X polarized wave differential detection+output of Y polarized wave differential detection=Zi(511)+jZq(511)=Z(511)

In this case, by applying an LPF to Xi[0] to Xi[511], Xq[0] to Xq[511], Yi[0] to Yi[511] and Yq[0] to Yq[511] with respect to a reception signal sequence, it is possible to realize resistance to distortion in the transmission path such as chromatic dispersion and PMD. At that time, it is also possible to perform down-sampling at the same time at the LPF. As a case where the LPF is simplified, adjacent two samples are added, converted into 1 sample/symbol, and input to the detection unit 4 in FIG. 1 and complex conjugate multiplications 14 and 15 in FIG. 10.

As described above, detection signals Z(1) to Z(511) (where 1, 3, ... 509, 511) are obtained. These are input to the ½ overlap FFT unit 7 which is 256 pt FFT, and DFT is performed. Meanwhile, DFT is performed on a known LP signal by the FFT unit 8 which is 256 pt FFT in a similar manner. These calculation results are subjected to division processing at the division unit 9, and a division result is input to the IFFT unit 10 which is 256 pt IFFT, and IDFT is performed. The maximum value detection unit 11 detects a maximum value A of an amplitude and a sample point $n_0$ at which the maximum value is obtained for 256 pieces of data subjected to IDFT. Similar processing is performed after data is shifted by 128 symbols (256 samples). For example, in the case where FFT is executed 300 times in one frame, the maximum value A of the amplitude and the sample point $n_0$ at which the maximum value is obtained are detected in each FFT. Further, in the case where FFT is executed in a plurality of frames, operation similar to that in Embodiment 2 is performed at the vectorization unit 12 and the averaging unit 13. Finally, the position detection unit 6 detects the position of the LP signal.

Note that, the known signal detection may be performed by recording a program for realizing the known signal detection method according to any one of the embodiments 1-3 in a computer-readable recording medium, making a computer system or a programmable logic device read the program recorded in the recording medium, and executing it. Note that the "computer system" here includes an OS and hardware such as a peripheral device or the like. In addition, the "computer system" also includes a WWW system including a homepage providing environment (or display environment). Furthermore, the "computer-readable recording medium" is a portable medium such as a flexible disk, a magneto-optical disk, a ROM or a CD-ROM, or a storage device such as a hard disk built in the computer system. Further, the "computer-readable recording medium" also includes the one holding the program for a fixed period of time, such as a volatile memory (RAM) inside the computer system to be a server or a client in the case that the program is transmitted through a network such as the Internet or a communication channel such as a telephone line. In addition, the program may be transmitted from the computer system storing the program in the storage device or the like to another computer system through a transmission medium or a transmission wave in the transmission medium. Here, the "transmission medium" that transmits the program is a medium having a function of transmitting information like the network (communication network) such as the Internet or the communication channel (communication line) such as the telephone line. Furthermore, the program may be the one for realizing a part of the above-described function. Further, it may be the one capable of realizing the above-described function by a combination with the program already recorded in the computer system, that is, a so-called difference file (difference program).

REFERENCE SIGNS LIST 1 polarization demultiplexer/optical-electrical converter; 2,3 sampling apparatus; 4 detection unit; 5 correlation detection unit; 6 position detection unit; 7 ½ overlap FFT unit; 8 FFT unit; 9 division unit; 10 IFFT unit; 11 maximum value detection unit; 12 vectorization unit; 13 averaging unit; 14,15 differential detection unit; 16 addition unit

The invention claimed is:

1. A known signal detection method detecting a position of a known signal in a reception signal by a known signal detection apparatus and comprising:
    performing Fourier transform on the reception signal to obtain a first calculation value;
    performing Fourier transform on the known signal to obtain a second calculation value;
    multiplying the first calculation value by a complex conjugate of the second calculation value to obtain a third calculation value;
    performing inverse Fourier transform on the third calculation value to obtain a fourth calculation value;
    detecting a maximum value of an amplitude in sample points of the fourth calculation value and a sample point at which the maximum value is obtained; and
    detecting the position of the known signal in the reception signal from the sample point at which the maximum value is obtained;
    generating a vector in which the maximum value of an amplitude in the sample points of the fourth calculation value is associated with an amplitude and the sample point is associated with a phase; and
    averaging the vector over a plurality of frames wherein the reception signal is made up of the plurality of frames in which the known signal is inserted at the same position in each frame,
    wherein the position of the known signal in the reception signal is detected from a sample point corresponding to a phase at which an amplitude of the averaged vector becomes a maximum.

2. The known signal detection method according to claim 1, wherein the maximum value is A, the sample point at which the maximum value is obtained is $n_o$, a size of discrete Fourier transform is N, and the vector is generated by A $\exp(j2_\pi(no/N))$.

3. The known signal detection method according to claim 1, wherein the vector is subjected to cumulative addition over the plurality of frames to average the vector.

4. The known signal detection method according to claim 1, wherein a Fourier transform window at which the amplitude of the averaged vector becomes a maximum is detected, and
    the position of the known signal In the reception signal is detected from a position of the Fourier transform window in a frame and the sample point corresponding to the phase at which the amplitude of the averaged vector becomes a maximum.

5. The known signal detection method according to claim 1, wherein the Fourier transform on the reception signal is performed while dividing the reception signal and making part of the reception signal overlap.

6. The known signal detection method according to claim 1, further comprising generating the reception signal by adding an inner product of an X polarized wave signal and a signal delayed by one symbol from the X polarized wave signal to an inner product of a Y polarized wave signal and a signal delayed by one symbol from the Y polarized wave signal.

7. A known signal detection method detecting a position of a known signal in a reception signal by a known signal detection apparatus and comprising:
    performing Fourier transform on the reception signal to obtain a first calculation value;
    performing Fourier transform on the known signal to obtain a second calculation value;
    multiplying the first calculation value by a complex conjugate of the second calculation value to obtain a third calculation value;
    performing inverse Fourier transform on the third calculation value to obtain a fourth calculation value;
    detecting a maximum value of an amplitude in sample points of the fourth calculation value and a sample point at which the maximum value is obtained;
    detecting the position of the known signal in the reception signal from the sample point at which the maximum value is obtained; and
    generating the reception signal by adding an inner product of an X polarized wave signal and a signal delayed by one symbol from the X polarized wave signal to an inner product of a Y polarized wave signal and a signal delayed by one symbol from the Y polarized wave signal.

* * * * *